(12) United States Patent
Biewer et al.

(10) Patent No.: US 11,440,384 B2
(45) Date of Patent: Sep. 13, 2022

(54) SLIDER UNIT AND ROOF SYSTEM

(71) Applicant: Roof Systems Germany GmbH, Dietzenbach (DE)

(72) Inventors: Christian Biewer, Dietzenbach (DE); Heiko Albert, Dietzenbach (DE)

(73) Assignee: Roof Systems Germany GmbH, Dietzenbach (DE)

( * ) Notice: Subject to any disclaimer, the term of this patent is extended or adjusted under 35 U.S.C. 154(b) by 711 days.

(21) Appl. No.: 16/412,482

(22) Filed: May 15, 2019

(65) Prior Publication Data

US 2019/0351747 A1 Nov. 21, 2019

(30) Foreign Application Priority Data

May 15, 2018 (DE) ...................... 10 2018 111 660.8

(51) Int. Cl.
*B60J 7/04* (2006.01)
*E05D 15/06* (2006.01)
*B60J 7/043* (2006.01)
*B60J 7/02* (2006.01)

(52) U.S. Cl.
CPC .............. *B60J 7/0435* (2013.01); *B60J 7/02* (2013.01); *B60J 7/024* (2013.01); *E05D 15/0604* (2013.01); *E05D 15/0682* (2013.01); *E05Y 2900/542* (2013.01)

(58) Field of Classification Search
CPC .......................... B60J 7/0435; E05D 15/0682

USPC ..... 296/216.03, 216.05, 220.01, 223, 216.09
See application file for complete search history.

(56) References Cited

U.S. PATENT DOCUMENTS

| | | | | |
|---|---|---|---|---|
| 4,114,945 | A | * 9/1978 | Lutz .......................... | B60J 7/02 384/42 |
| 4,811,925 | A | * 3/1989 | Fujita ................... | B60N 2/0707 384/34 |
| 6,763,550 | B2 | * 7/2004 | Regnier ................ | E05F 11/382 16/93 R |
| 10,023,032 | B2 | * 7/2018 | Knoepfle ................... | B60J 7/02 |
| 2009/0134672 | A1 | 5/2009 | Hirata et al. | |
| 2014/0306492 | A1 | * 10/2014 | Heidan .................. | B60J 7/0435 296/216.03 |
| 2017/0267076 | A1 | * 9/2017 | Knoepfle ................... | B60J 7/02 |

FOREIGN PATENT DOCUMENTS

| DE | 926216 B | 4/1955 | |
|---|---|---|---|
| DE | 20217286 U1 | 2/2003 | |
| DE | 102008017526 B3 | * 9/2009 | ............ B60J 7/0435 |

\* cited by examiner

*Primary Examiner* — Dennis H Pedder
(74) *Attorney, Agent, or Firm* — Dilworth IP, LLC

(57) ABSTRACT

A slider unit for a roof system of a motor vehicle has a slide body and a mounting unit which has a recess in which the slide body is accommodated. The slide body is mounted in the mounting unit such that, relative to the mounting unit, the slide body is movable in at least two directions in each case limited to a predefined distance and/or is pivotable about two axes limited to a predefined angle.

12 Claims, 4 Drawing Sheets

SLIDER UNIT AND ROOF SYSTEM

The invention relates to a slider unit for a roof system of a motor vehicle, and a roof system for a motor vehicle.

BACKGROUND OF THE INVENTION

Roof systems for motor vehicles which have a roof element capable of tilt-and-slide movements and being formed for example of glass, are known in different variants from the prior art.

The roof element typically has guide rails with a slider unit associated to each of them, by means of which the roof element is forcibly guided during the tilt-and-slide adjustment.

During driving over rough surfaces the slider unit has to absorb dynamic loads which are caused by the movement of the roof element. Added to this, it is necessary to accept tolerances which result from manufacturing tolerances and thermal expansions.

The object of the invention is to provide a slider unit for a roof system of a motor vehicle and a roof system for a motor vehicle, in which tolerances and movements of the roof element can be better compensated for.

SUMMARY OF THE INVENTION

The object is achieved according to the invention by a slider unit for a roof system of a motor vehicle, with a slide body and with a mounting unit which has a recess in which the slide body is accommodated, wherein the slide body is mounted in the mounting unit such that, relative to the mounting unit, the slide body is movable in at least two directions in each case limited to a predefined distance and/or is pivotable about two axes limited to a predefined angle. The predefined distances and the predefined angles for the movements in the individual directions and for the pivoting movements about the individual axes can be different from each other or identical. Jolts which act on the roof system during driving over rough surfaces (in particular during an adjustment of the roof element) and tolerances are balanced out by the movable mounting of the slide body in the mounting unit, with the result that the slider unit according to the invention compensates for corresponding dynamic loads on the roof system. Further damping devices for damping dynamic loads are thereby no longer necessary and a simpler structural design of the rest of the roof system results.

The slide body is associated with a guide rail of a roof element of the roof system and connected to the guide rail such that the guide rail is forcibly guided by the slide body during a tilt and/or slide adjustment of the roof element by the slide body. In particular, for this, the slide body has a recess, in which the guide rail is accommodated.

The slide body can be formed substantially complementary or similar to the recess in the mounting unit. By similar is meant that the slide body has substantially the same shape as the recess, but is made smaller than the recess.

According to an embodiment of the invention, relative to the mounting unit, the slide body is movable in three directions in each case limited to a predefined distance and/or is pivotable about three axes limited to a predefined angle. The slider unit according to the invention can thereby compensate for dynamic loads during driving and/or during adjustment of the roof element in all directions.

One aspect provides that there is a predefined clearance between the mounting unit and the slide body, in particular a predefined clearance in the form of a transition fit. The movability and/or pivotability of the slide body relative to the mounting body is made possible at least in part by the predefined clearance in this embodiment of the invention. In particular, the predefined distance by which the slide body is movable relative to the mounting unit and/or the predefined angle by which the slide body is pivotable relative to the mounting unit are/is defined by the clearance.

According to a further aspect an elastic compensation element is provided which is arranged between the mounting unit and the slide body. The movability and/or pivotability of the slide body relative to the mounting body is made possible at least in part by an elastic deformation of the compensation element. In addition, jolt-like dynamic loads are damped, and thus particularly well compensated for, by elastic deformation of the compensation element.

The slide body can be at least in part formed of an elastic material. Accordingly, at least some of the movability and/or pivotability of the slide body relative to the mounting body is provided by elastic deformations of the slide body itself. In addition, jolt-like loads are damped by elastic deformations of the slide body.

According to a further embodiment of the invention the recess in the mounting unit has a spherical shape. The recess accordingly has a high degree of rotational symmetry, whereby the slide body accommodated in the mounting unit is rotatable about at least two, in particular about three, axes relative to the mounting unit.

Alternatively, the recess in the mounting unit can have a substantially cylindrical shape, in particular a substantially circular-cylindrical shape. Accordingly, in this variant the slide body is rotatable about a longitudinal axis of the cylindrical recess at least by the predefined angle relative to the mounting unit and/or movable along the longitudinal axis at least by the predefined distance. Pivoting movements about other axes and movements in other directions, on the other hand, are possible only within the scope of a clearance provided between the mounting unit and the slide body and elastic deformations of the individual components.

Stops can be provided on the slide body and/or on the mounting unit which limit the movability and/or pivotability of the slide body relative to the mounting unit in one or more directions or about one or more axes.

In particular, a length and a diameter of the recess are in the same order of magnitude. Through the choice of a ratio between the length and diameter of the recess, the pivotability of the slide body about axes other than the longitudinal axis of the cylindrical recess can be adapted. For example, the length of the recess lies in the range from half the diameter up to five times the diameter.

A further aspect provides that the slide body and the mounting unit consist of different materials from each other. Through the choice of the material combination, the properties of the slider unit can be adapted, in particular with respect to stability and elasticity. The mounting unit preferably consists of a dimensionally stable material, in particular of a metal, for example of steel. The slide body further preferably consists of a material with a low coefficient of friction, for example of plastic, which can be an elastomer.

The object is furthermore achieved according to the invention by a roof system for a motor vehicle, with a roof element which has at least one guide rail associated with at least one slider unit as defined above. With respect to the advantages, reference is made to the above explanations.

The slide body is preferably formed to accommodate the guide rail. The guide rail is thereby guided particularly stably during an adjustment of the roof element.

BRIEF DESCRIPTION OF THE DRAWINGS

Further aspects and advantages of the invention follow from the description below and the attached drawings, to which reference is made. In the drawings.

DETAILED DESCRIPTION OF THE INVENTION

Figure 1:
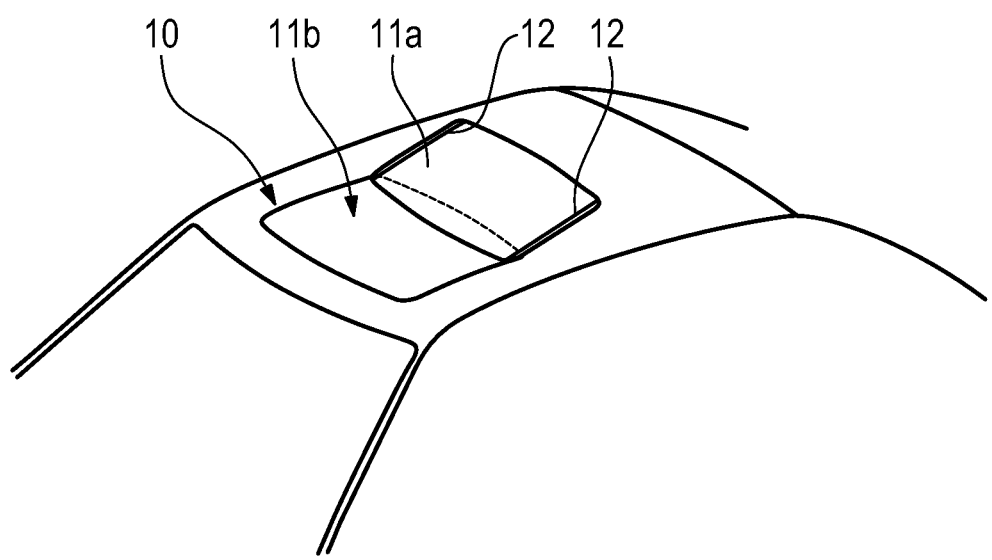
FIG. 1 is a schematic view of a roof system according to the invention.

FIGS. 1 to 4 show a roof system 10 for a motor vehicle. The roof system 10 is fitted on a roof of the motor vehicle and has a movable roof element 11a (shown only in FIG. 1) which comprises, for example, a glass pane and serves to selectively uncover or close an opening 11b in the vehicle roof. In particular, the movable roof element 11a is tiltable and/or displaceable in the vehicle's longitudinal direction L in order to uncover or close the opening 11b. If the opening 11b is uncovered, fresh air and light from the motor vehicle's surroundings can enter the motor vehicle through the opening 11b.

The roof system 10 comprises guide rails 12, attached on two opposite sides of the roof element 11a, which extend in the vehicle's longitudinal direction L.

The guide rails 12 are attached to the roof element 11a immovable relative to the roof element 11a.

The guide rails 12 are each associated with an adjustment unit 14, by means of which the roof element 11a is guided in the vehicle's longitudinal direction L and/or in the vehicle's height direction H during adjustment.

The adjustment units 14 in turn each comprise an opening lever 16 and a slider unit 18 attached to the opening lever 16.

The slider units 18 are in each case connected to the guide rails 12 such that the guide rails 12, and thus the roof element 11a, are forcibly guided by the slider units 18 during an adjustment of the roof element 11a.

Figure 2:
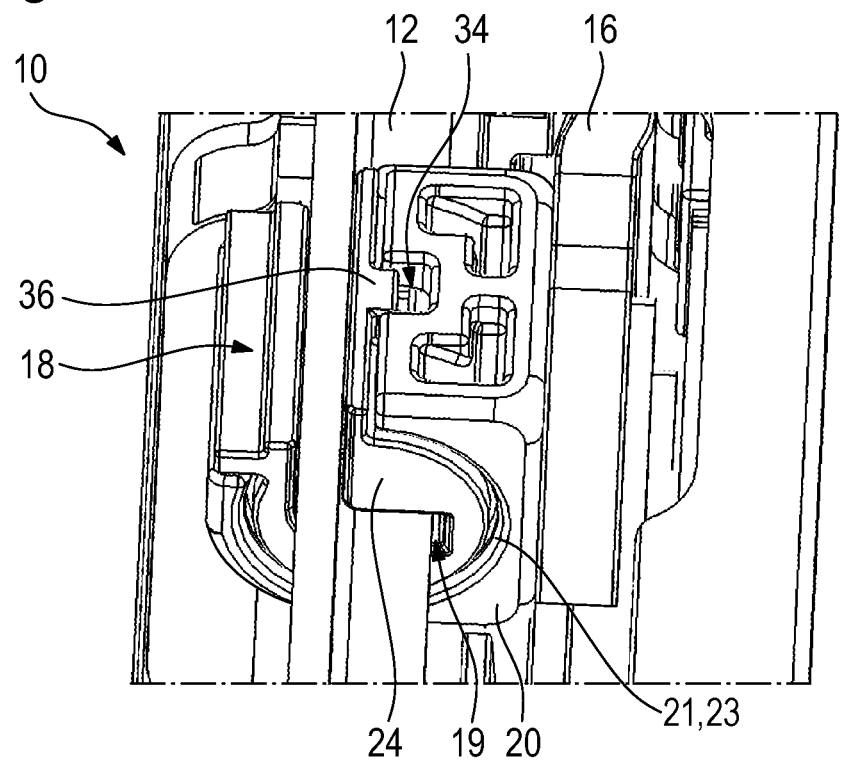
FIG. 2 is a detail view of a roof system according to the invention.
Figure 3:
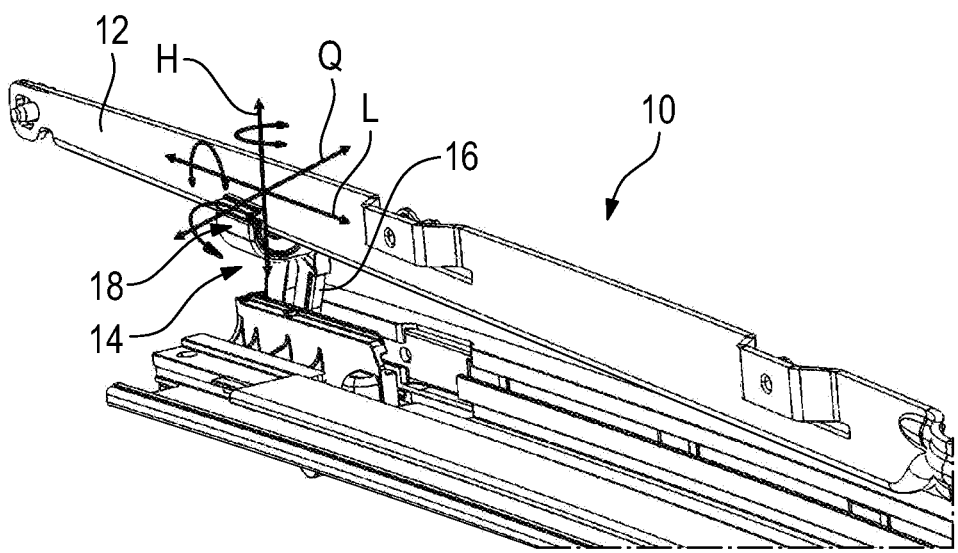
FIG. 3 is the roof system according to the invention in an opened state.
Figure 4:
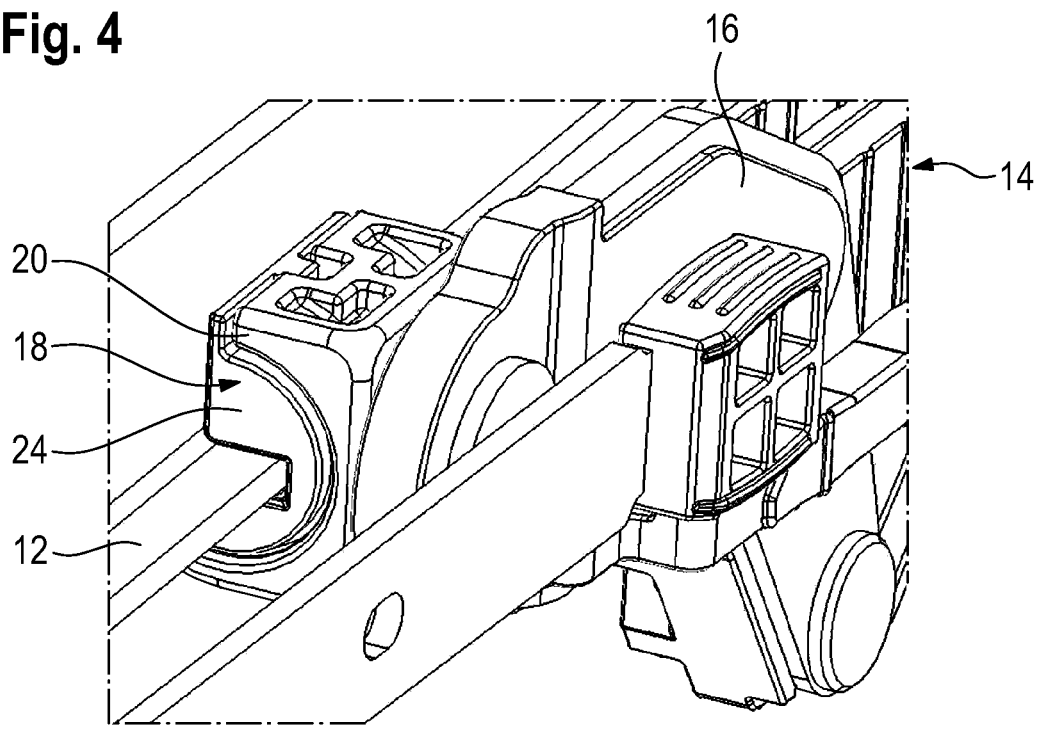
FIG. 4 is the roof system according to the invention in a closed state.

In the embodiment shown in FIGS. 2 to 4 the slider units 18 have a recess 19, in which the guide rails 12 are accommodated.

However, other suitable embodiments of the connection between the slider units 18 and the guide rails 12 are also possible.

The structure of the adjustment unit 14 and of the slider unit 18 is explained in more detail in the following with reference to FIGS. 5 to 7.

The slider unit 18 comprises a mounting unit 20 with a recess 22, in which a slide body 24 is accommodated.

The slider unit 18 furthermore has a pin 26, by means of which the slider unit 18 is attached to the opening lever 16 rotatable about a transverse axis Q.

In the variant shown the slide body 24 has the recess 19, extending in the longitudinal direction L, which is formed to accommodate one of the guide rails 12.

Accordingly, the slider units 18 and the respectively associated guide rails 12 are movable relative to each other in the longitudinal direction L, but immovable relative to each other in the height direction H and the transverse direction Q.

The slide body 24 is accommodated in the recess 22 such that the slide body 24 is movable relative to the mounting unit 20 in at least two directions L, H, Q and/or is pivotable relative to the mounting unit 20 about at least two axes L, H, Q, but in each case at most by a predefined distance or a predefined angle.

The slide body 24 can also be movable in three directions L, H, Q relative to the mounting unit 20 limited to a predefined distance and/or pivotable about three axes L, H, Q relative to the mounting unit 20 limited to a predefined angle.

Because the slide body 24 is movable relative to the mounting unit 20, the slide body 24 can compensate for dynamic loads occurring during driving and/or adjustment of the roof element 11a.

The movable/pivotable mounting of the slide body 24 is effected by one or more of the variants explained in the following.

The movability and/or pivotability of the slide body 24 can be provided at least in part by a clearance 21 between the slide body 24 and the mounting unit 20, in particular by a clearance 21 in the form of a transition fit 21.

Moreover, at least one elastic compensation element 23 can be provided between the slide body 24 and the mounting unit 20. Accordingly, at least some of the movability and/or pivotability is provided by an elastic deformation of the at least one compensation element 23.

Alternatively or additionally, at least some of the movability and/or pivotability can be achieved in that the slide body 24 itself consists at least in part of an elastic material, for example of an elastomer.

In particular, the slide body 24 and the mounting unit 20 consist of different materials from each other. The mounting unit 20 preferably consists of a dimensionally stable material, in particular of metal.

Furthermore, at least some of the movability and/or pivotability can be provided by a shaping of the recess 22 in the mounting unit 20 and/or of the slide body 24.

If, for example, the recess 22 and the slide body 24 are in each case designed spherical, the slide body 24 is rotatable about the three axes L, H, Q relative to the mounting unit 20 merely on the basis of the rotational symmetry of this arrangement.

Figure 5:
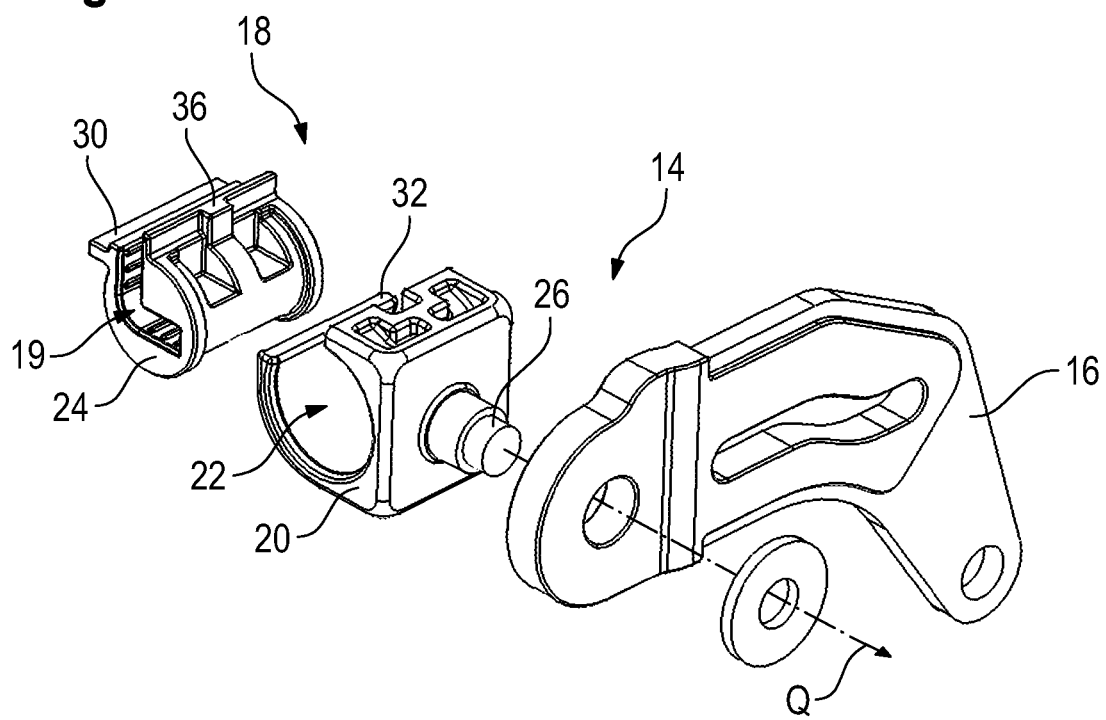
FIG. 5 is an exploded view of a slider unit according to the invention.
Figure 6:
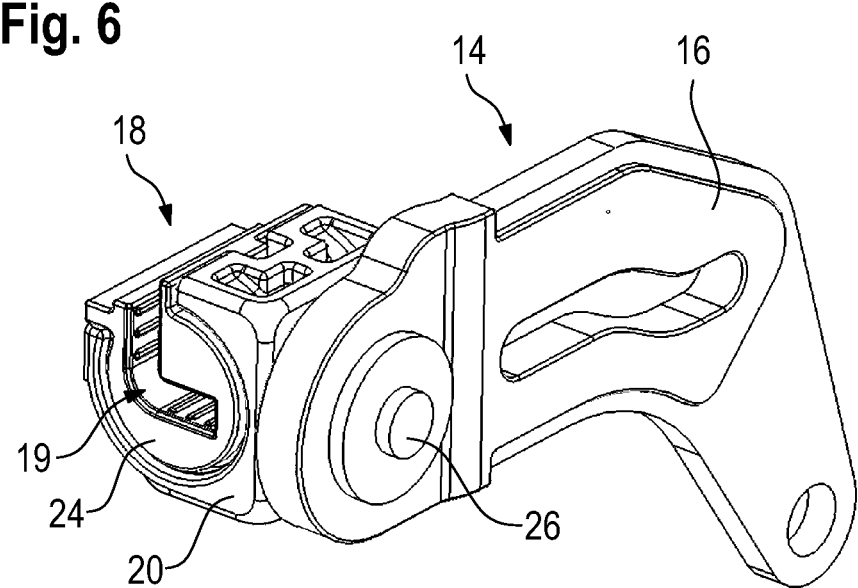
FIG. 6 is the slider unit from FIG. 5 in the fitted state.
Figure 7:
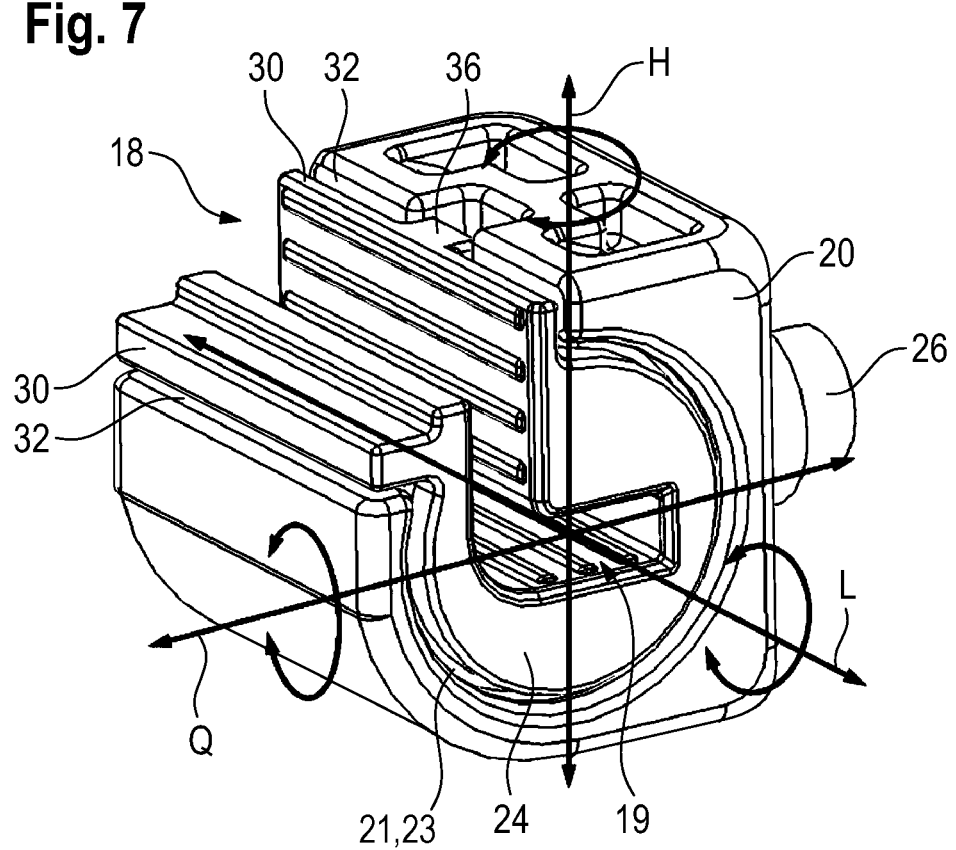
FIG. 7 is a view of the slider unit according to the invention rotated by 90° relative to FIG. 6.

In the variant shown in FIGS. 5 to 7 the recess 22 in the mounting unit 20 and the slide body 24 in each case have a substantially circular-cylindrical shape. A diameter of the recess 22 here is preferably in the same order of magnitude as a length of the recess 22.

The symmetry of this arrangement means that movements of the slide body 24 in the height direction H and the transverse direction QQ and pivoting movements about the corresponding axes H, Q are limited by a clearance 21 between the slide body 24 and the mounting unit 20 and by elasticities of the components.

In order to limit a rotation of the slide body 24 about the longitudinal axis L, stops 30 and 32 corresponding to each other are provided on the slide body 24 and on the mounting unit (see FIGS. 5 and 7).

Furthermore, in order to limit a movement of the slide body 24 in the longitudinal direction L, the mounting unit 20 has an indentation 34, in which a lug 36 of the slide body 24 engages.

The invention claimed is:

1. A slider unit for a roof system of a motor vehicle, with a slide body and with a mounting unit which has a recess in which the slide body is accommodated, wherein the slide body is mounted in the mounting unit such that, relative to the mounting unit, the slide body is movable in three directions in each case limited to a predefined distance and/or is pivotable about three axes limited to a predefined angle.

2. The slider unit of claim 1 wherein there is a predefined clearance between the mounting unit and the slide body.

3. The slider unit of claim 1 wherein an elastic compensation element is provided which is arranged between the mounting unit and the slide body.

4. The slider unit of claim 1 wherein the slide body is at least in part formed of an elastic material.

5. The slider unit of claim 1 wherein the recess in the mounting unit has a substantially cylindrical shape.

6. The slider unit of claim 5 wherein a length and a diameter of the recess are in the same order of magnitude.

7. The slider unit of claim 1 wherein the slide body and the mounting unit consist of different materials from each other.

8. A roof system for a motor vehicle, with a roof element which has at least one guide rail which is associated with at least one slider unit as defined in claim 1.

9. The roof system of claim 8 wherein the slide body is formed to accommodate the guide rail.

10. The slider unit of claim 2 wherein the predefined clearance is in the form of a transition fit.

11. The slider unit of claim 1 wherein the recess in the mounting unit has a substantially circular-cylindrical shape.

12. The slider unit of claim 11 wherein a length and a diameter of the recess are in the same order of magnitude.

* * * * *